United States Patent [19]

Slysh

[11] Patent Number: 5,122,242
[45] Date of Patent: Jun. 16, 1992

[54] ELECTROCHEMICAL MACHINING PROCESS

[76] Inventor: Paul Slysh, P.O. Box 711401, San Diego, Calif. 92171

[21] Appl. No.: 612,866

[22] Filed: Nov. 13, 1990

[51] Int. Cl.$^5$ .......................... B23H 3/04; B23H 3/10; B23H 9/00
[52] U.S. Cl. .............................. 204/129.2; 204/129.5; 204/129.55; 204/129.7; 204/129.25
[58] Field of Search ............... 204/129.2, 129.5, 129.7, 204/129.25, 129.55, 284

[56] References Cited

U.S. PATENT DOCUMENTS

| | | | |
|---|---|---|---|
| 3,058,895 | 10/1962 | Williams | 204/129.7 X |
| 3,188,284 | 6/1965 | Flinn et al. | 204/129.2 X |
| 3,403,085 | 9/1968 | Berger et al. | 204/129.7 |
| 3,740,519 | 6/1973 | O'Connor | 204/129.25 X |
| 3,849,271 | 11/1974 | Joslin | 204/129.2 |
| 4,459,190 | 7/1984 | Inoue | 204/129.7 |
| 4,767,903 | 8/1988 | Sciaroni | 204/129.2 |
| 4,980,533 | 12/1990 | Rabian | 204/129.5 X |

Primary Examiner—Donald R. Valentine

[57] ABSTRACT

An electrochemical machining process for the production of integrally stiffened shell and plate structures. The process applies to such structures as isogrid, waffle, ring stiffened and stringer stiffened structures. In these structures, secondary rib stiffening patterns are generated and shaped by inducing protrusions at selectively positioned electrolyte feeder orifices in electrode tools. Fillets and blending radii between ribs and skins as well as the thickness and width variations of the skins and ribs are controlled to enhance structural performance through electrode tool shaping, and control of electrolyte flow, applied voltage, electrolyte pressure, and electrode oscillation.

11 Claims, 2 Drawing Sheets

ELECTROCHEMICAL MACHINING PROCESS

BACKGROUND OF THE INVENTION

This invention is of an electrochemical machining process for the manufacture of integrally stiffened shell and plate structures such as waffle, ring stiffened and stringer stiffened structures.

Said structures typically comprise a skin integral with numerous stiffening ribs. In the case of shell isogrid and waffle structures for which a flat pattern can be developed, said ribs form respectively triangular and rectangular pockets. In the case of such ring and stringer stiffened structures said ribs are oriented in respectively the circumferential and longitudinal directions. Shells with compound curved surfaces and flat plates may typically be comprised of skins stiffened by a variety of crossing and non-crossing rib stiffening patterns.

Said structures are typically made of aluminum or titanium and are produced by such processes as machining, chemical machining, or investment casting.

In the case of machined structures, the minimum producible skin thickness, typically 0.018 inches, is influenced by the deformation of the skins due to residual or machining induced stresses. Such structures must also include rib blending radii which are equal to or greater than the radius of the end mill used for material removal. Machining tolerance on skin thickness and rib width are typically ±0.005 inch.

When chemical machining is used to produce said structures the skin thickness and rib width tolerance are respectively typically ±0.008 inch and ±0.030 inch. The minimum skin and rib gages is typically 0.020 inch. A single chemical machining cut produces rib-to-rib and rib-to-skin blending radii approximately equal to the depth of cut. A double chemical machining cut at most cuts these blending radii in half and produces a rib cross section having properties approximating that of a machined blade.

Investment castings typically have minimum gages of 0.090 inch, gage tolerances of ±0.025 inch and minimum blending radii of 0.125 inch.

Electrochemical machining, applied according to the processes described in this patent, can produce minimum gages, tolerances and blending radii significantly smaller than the best of these features achieved by the above described machining, chemical machining and casting processes.

Electrochemical machining is typically performed by:
- applying a variable controlled voltage in the range of zero to 100 volts to the workpiece to be electrochemically machined,
- injecting electrolyte, such as salt water solution or sodium nitrate, at pressures in the range of 100 to 3000 psi, into the gap between the shaped and grounded electrode tools and the workpiece and providing back pressure for sustaining this hydrodynamic pressure by restricting but not preventing the flow of electrolyte,
- causing the action of the electrolyte hydrodynamic forces to separate the workpiece and cathodic electrode tool,
- forcing the electrode against the workpiece and insuring that the electrolyte hydrodynamics action prevents metal to metal contact between the electrode tool and the workpiece,
- controlling the electrolyte flow to wash away metal ions formed in the electrolyte before the ions are able to plate the electrode tool.
- controlling the electrolyte flow to carry away excess heat generated during the electrochemical machining process, and
- controlling the voltage applied to the workpiece as a function of the displacement and force applied to the workpiece.

Metal removal is accomplished by a reverse electroplating or anode depletion or deplating process producing a metallic hydroxide emulsion suspended in the electrolyte. A filter press is used to remove the metal hydroxides produced by the electrochemical machining process and to return the reusable electrolyte to the electrolyte pumping system.

The induction of unidirectional electrolyte flow across the face of the electrode tool requires use of complex sealing schemes. Alternatively, the introduction of electrolyte into the electrode tool results in a hump, bump or protrusion under the electrolyte feeder orifice.

The above described electrochemical machining systems are too complex, costly and technically limited to be applicable to the production of said integrally stiffened structures. This invention overcomes these and other limitations and converts typically undesirable electrochemical machining attributes into vitally useful features.

BRIEF DESCRIPTION OF FIGURES

Further details of the invention, and certain preferred embodiments thereof will be further understood upon reference to the drawing, wherein.

DESCRIPTION OF INVENTION

Figure 1:
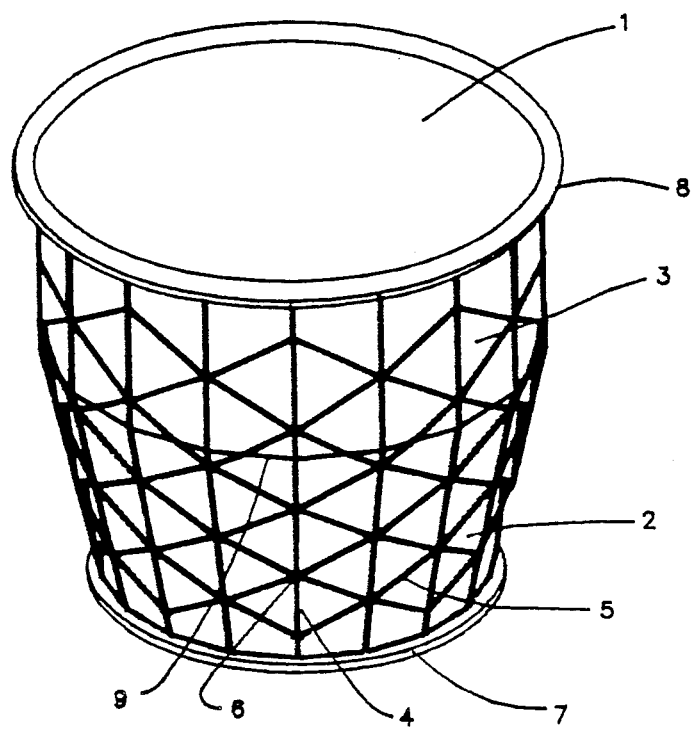
FIG. 1 shows an overall view of a typical isogrid structure consisting of a conical section 2, a cylindrical section 3, longitudinal ribs 4, diagonal ribs 5, a boss 6, forward and rear bolted flanges 7 and 8 and kick ring 9.
Figure 8:
FIGS. 8 and 9 are respectively blade and flanged skin-rib cross sections produced by electrochemical machining.

The preferred embodiment of this invention is described in part by applying it to produce the isogrid structure shown in FIG. 1, having rib cross sections consisting of tapered blades, 10, and skin, 11, as shown in FIG. 8. The triangular pockets formed by these ribs are produced by one or more actuated electrochemical machining electrodes, such as 16, 17 and 18, as shown in FIG. 2.

Figure 2:
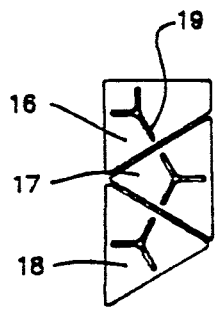
FIG. 2 shows a cluster of integral isogrid shaped electrochemical machining electrodes.
Figure 2A:
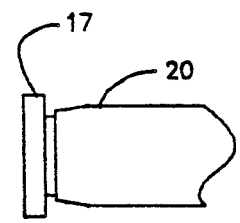
FIG. 2A is a side view showing of one of the isogrid shaped electrochemical machining electrode shown in FIG. 2.

The electrodes shown in FIGS. 2 and 2A include a set of centrally located electrolyte injection orifices 19 arranged in Y-shaped patterns corresponding to the position of the secondary ribs, 12, in FIG. 8. The orifice pattern is used to: (a) create a triangulated bump or structurally advantageous secondary rib pattern, (b) regulate electrolyte hydrodynamic pressure depending on the match between the curvature of the electrode surface and the initial curvature of the workpiece, (c) regulate electrolyte hydrodynamic pressure depending on the gap between the electrode forward surface and the formed surface of the workpiece and (d) induce a uniform flow of electrolyte for flushing away debris or sludge created by deplating of the workpiece.

Injection of electrolyte into orifices groups is also regulated as a function of the desired features in the secondary rib pattern, the initial mismatch between electrode and workpiece outside surface and the plunged position of the electrode.

The secondary ribs are produced in this invention by reduced metal removal in the vicinity of the orifices pattern 19 due to local reduction in the electrode area, by electrolyte pressure perturbation and by the use of secondary rib mold patterns in the electrodes.

Bumps such as those forming secondary rib patterns in this invention are normally undesirable electrochemical machining features. This invention converts such undesirable features into essential and useful features.

Orifice pattern is defined as one or more shaped flow passages in a pocketing electrode tool for the delivery of electrolyte and for electrochemically machining secondary rib patterns in the pocket.

In this invention, said electrodes are clustered in longitudinal sets of pockets and are actuated along an axis that is normal to and bisects the distance between the extreme longitudinal ribs bounding these products. At the intersection of this axis with the shell, the linear displacement of the electrode is in a direction substantially normal to the local shell curvature. At points circumferentially removed from this intersection point the electrode displacement is not normal to the local surface.

When the curvature of areas of the electrode cluster is made to match the workpiece initial outside curvature, a nonuniform isogrid skin thickness is produced. As an example: for a 40 inch diameter shell comprised of 20 longitudinal ribs, having maximum pocket depth of 0.2 inch and using a single row of longitudinally clustered electrodes, the skin is 0.0011 inch thicker at the longitudinal ribs than at the centers of the pockets. For the same part using two adjacent rows of longitudinally clustered electrodes the skin is 0.0044 inch thicker at the extreme longitudinal ribs than at the mid point between these ribs.

In this invention, skin thickness variations such as the above may be used to contribute to the structural efficiency.

In this invention, skin thickness variations such as the above may also be eliminated by using an electrode frontal curvature that matches the required finally produced skin curvature. Since said electrode curvature would not match the initial outside curvature of the workpiece, the electrolyte hydrodynamic pressure between the electrode and workpiece is initially not uniform. This non-uniform pressure is compromised in this invention by locating orifices at critical positions relative to the initial contact areas between the electrodes and workpiece and regulating the flow of electrolyte through these orifices to maximize hydrodynamic pressure between the initial frontal contact areas. As metal removal progresses, the flow through these and other orifices are modified to achieve uniform hydrodynamic pressure over the entire frontal area.

This invention allows for selection of compromises between the frontal curvatures of the electrodes and initial workpiece surface and the uniformity of the finally achieved skin thickness. Such compromises are also, in part or totally, further replaced by controlling the distribution of and the flow control in the electrode orifices.

In this invention, the perimeters or sides of the individual pocketing electrodes are shaped to produce skin to rib fillets and differently sloped rib sides generated by the plunging of the electrode into the workpiece. Thus, ribs at extreme longitudinal rib positions can have rib widths either greater or smaller at the skin than at the outside surface. However, ribs lying at or close to mid spans between extreme longitudinal rib positions can typically have widths equal to or greater at the skin than at the outside surface.

This invention also applies to shell structures having internally oriented ribs. In this case, the ribs lying at or close to mid spans between extreme longitudinal rib positions can typically have ribs equal to or narrower at the skin than at the inside surface.

Additionally, this invention employs one or more linear and/or curvilinear modes of oscillations of the electrode, superimposed on the normal linear displacement of the electrode, to correct normally produced rib tapers and to create a variety of uniform and nonuniform rib undercuts.

Figure 3:
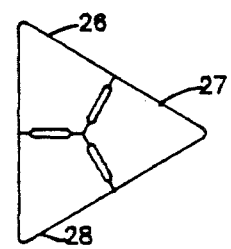
FIGS. 3 and 4 are segmented isogrid shaped electrochemical machining electrodes.
Figure 4:
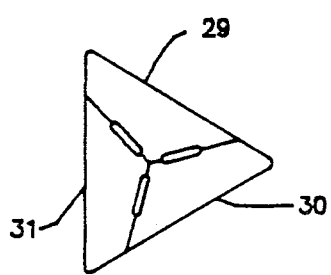
Figure 5:
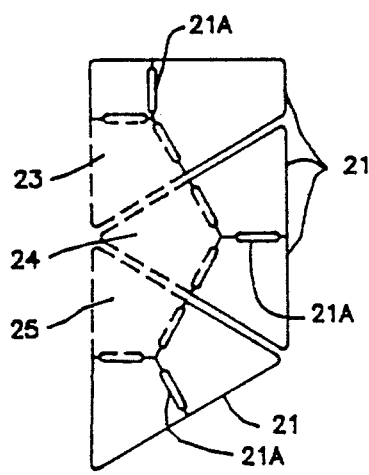
FIG. 5 is a modified cluster of isogrid shaped electrochemical machining electrodes.
Figure 6:
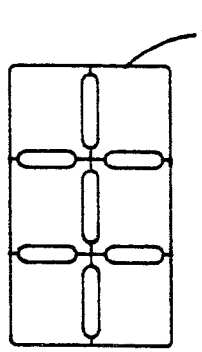
FIG. 6 and 7 are segmented waffle shaped electrochemical machining electrodes.

To facilitate the inclusion of local features into isogrid, the electrodes can be divided into segments 26, 27 and 28 as shown in FIG. 3 or into segments 29, 30 and 31 as in FIG. 4. FIG. 5 shows how such clustered electrodes 21 with segments 23, 24 and 25 removed can form part of a boss. Orifices 21a are used for electrolyte delivery in this case.

The boss perimeter in FIG. 5 can alternatively be replaced with the actual boss perimeter by approximately tailoring each clustered electrode.

In addition to the removal of segments of an electrode one or more electrodes can be removed to provide areas for inclusion of local features. Such features can, for example, be bosses or mounting areas which are electrochemically machined in separate operations.

Since the orifices are distributed over a substantial part of the frontal faces of the electrodes the electrolyte flow paths can be kept short compared to the overall sizes of the frontal faces. Adversely large pressure drops due to excessively long flow paths are eliminated in this invention. Consequently, the need for back pressure to insure a uniform flow across the frontal face is eliminated.

The influence on electrolyte flow uniformity under any electrode due to workpiece features adjacent are minimized by virtue of the short electrolyte flow paths.

Figure 7:
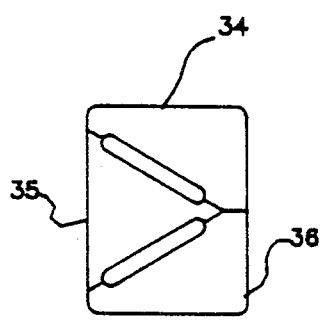

This invention also applies to the production of a waffle structure for which the individual electrodes can be integral or composed of segments such as 33 in FIG. 6 or 34, 35 and 36 in FIG. 7.

Electrodes for typically producing isogrid and waffle type pockets can optionally overlap or have no ribs separating them.

Figure 9:

This invention applies to the production of rib undercuts as 14 in rib 13 in FIG. 9. The rib undercut can leave or eliminate base features such as 15 in FIG. 9.

Figure 10:
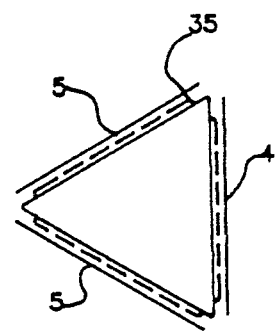
FIGS. 10 and 11 are plan views of isogrid pockets showing uniform undercuts extending respectively along the rib and along the rib and rib intersections.
Figure 11:
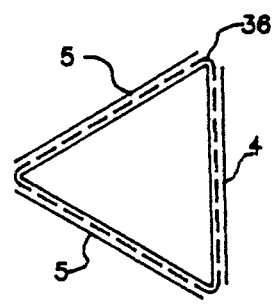
Figure 12:
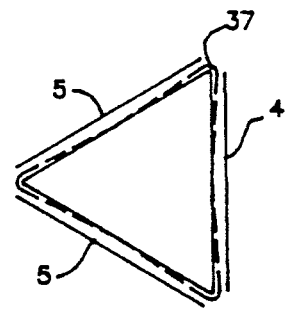
FIG. 12 is a plan view of an isogrid pocket showing nonuniform undercuts along the rib and rib intersections.

As shown in FIG. 10, the uniform undercut, 35, can be limited to separate the straight sides of longitudinal ribs 4 and circumferential ribs 5. In FIG. 11, the uniform undercut, 36, extends around the entire pocket. In FIG. 12, nonuniform undercut, 37, extends around the entire pocket.

In this invention, the electrode tools for producing rib undercuts may require the use of electrical insulation to prevent material removal from the skin while the undercuts are being generated. Alternatively, sufficiently large gaps between the electrodes and skins can serve the same purpose and eliminate the need for the insulation.

Figure 13A:
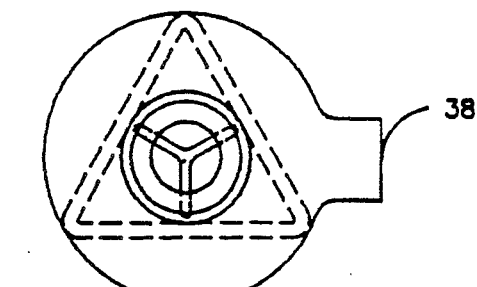
FIG. 13A is a top plan view of FIG. 13 partially in phantom.
Figure 13:
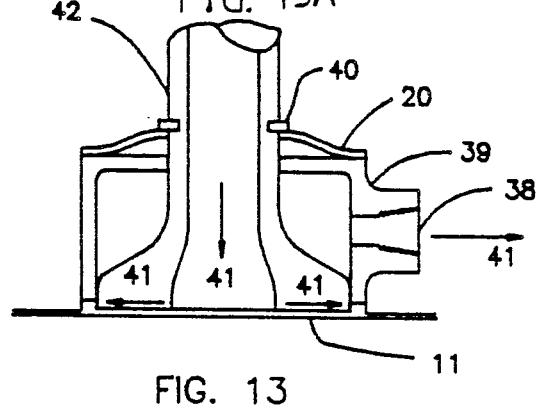
FIG. 13 shows a scheme for controlling the back pressure on an electrode.

In this invention hydrodynamic back pressure can be provided by the change in direction of the electrolyte stream when it encounters the perimeter of a pocket. Before and after the pocket takes shape, this invention permits the build up and control of back pressure by the use of a shield 39 in FIGS. 13 and 13A around the electrode 42 which is axially spring loaded by 20 or forced against the nonelectrochemically machined perimeter of the pocket to dam the flow of electrolyte and control the back pressure.

Retainer 40 transmits axial forces from the electrode tool 42 into the belville spring 20. The electrolyte flow direction is 41 as shown or can be reversed.

This invention applies to the production of single and compound curved shells and plates including transition grid patterns such as used between the shell and bolted flanges and other shell features.

Structural continuity between the secondary ribs and the primary ribs can be enhanced with this invention by the described secondary rib production techniques without incurring excess nonoptimum weight penalties such as occur at fillets and corner radii in conventional chemical machining and machining of such ribs.

In this invention, both primary and secondary ribs can be tapered. This invention applies to the production of integral rib stiffening in workpieces both before and after they have been formed and/or hot sized.

Control of the workpiece as for positioning, backing up and restraining it during electrochemical machining may be accomplished with the aid of a multi-axis drive system and/or robots and/or simple positioning and holding fixtures.

This invention includes the enhancement of rib undercut and rib side shaping by the process of oscillating the electrodes in a plane substantially perpendicular to the plunging axis or substantially parallel to the skin surface produced by the electrochemical machining process. The oscillation is selected to start after the electrode has been sufficiently plunged into the workpiece to cause the rounded perimeters of the electrodes to be below the level of the workpiece initial surface. The degree of oscillation is initially substantially less than the gap between the perimeter of the electrode and the pocket it produced. As electrochemical machining progresses and this gap increases the degree of oscillation is increased. The shape of the undercut is controlled by modulating the shape and time histories of the oscillation as a function of depth of cut.

While certain specific components, procedures and arrangements have been detailed in the above description of the preferred embodiments of this invention, these may be varied and other components, procedures and arrangements used, where suitable, with similar results. Other applications and variations of the present invention will occur to those skilled in the art upon reading this disclosure. These are intended to be included within the scope of this invention, as defined in the appended claims. The present embodiments of the appended claims and all changes which come within the meaning and range of equivalency of the claims are therefore intended to be embraced by the claims.

I claim as my invention and desire to be protected by Letters Patent of the United States:

1. An electrochemical machining process for enhancing the production of pocketed integrally stiffened shell and plate structures comprising the steps of:
   producing a blank workpiece form,
   positioning selected areas of the workpiece for the application of one or more electrode tools onto said areas, for each selected area, selecting one or more of said electrode tools including faces shaped to provide a substantially uniform gap between said electrode tools and the selected area to be electrochemically machined and mold depressions in one or more of said electrode tools to produce one or more secondary ribs,
   selecting in said electrode tools differently shaped electrolyte delivery orifices and electrolyte flow rates therein to produce a hydrodynamic pressure between said electrode tools and the workpiece,
   affecting metal removal and leaving one or more controlled patterns of secondary ribs under said orifices by plunging said electrode tools into said area, regulating said electrolyte flow as a function of the desired features of said pattern of said secondary ribs, the initial mismatch between electrode and workpiece outside surface and the plunged position of the electrode and applying depleting voltage to the workpiece.

2. The electrochemical machining process according to claim 1 wherein one or more selected electrode tools include different frontal faces shaped to substantially produce a final net shape in the workpiece.

3. The electrochemical machining process according to claim 1 wherein the electrolyte flow rates in individual or grouped orifices are separately controlled to enhance the efficiency and/or accuracy of metal removal.

4. The electrochemical machining process according to claim 1 wherein one or more pockets are produced having no rib or ribs separating them.

5. The electrochemical machining process according to claim 1 wherein selected electrode segments are used to form the orifice shape by providing gaps between the segments.

6. The electrochemical machining process according to claim 1 wherein electrolyte flow is controlled in orifices to produce a secondary rib stiffening pattern on skins bounded by primary pocket ribs.

7. The electrochemical machining process according to claim 1 wherein a varying height secondary rib pattern is produced under said orifice by controlling the shape of said orifice.

8. An electrochemical machining process for enhancing the production of pocketed integrally stiffened shell and plate structures comprising the steps of:

producing a blank workpiece form, positioning selected areas of the workpiece for the application of one or more electrode tools onto said areas, for each selected area, selecting one or more of said electrode tools including faces shaped to provide a substantially uniform gap between said electrode tools and the selected area to be electrochemically machined and mold depressions in one or more of said electrode tools to produce one or more secondary ribs, selecting in said electrode tools shaped electrolyte delivery orifices and electrolyte flow rates therein to produce a hydrodynamic pressure between said electrode tools and the workpiece, affecting metal removal and leaving one or more controlled patterns of secondary ribs under said orifices by plunging said electrode tools into said area, inducing said electrolyte flow and applying depleting voltage to the workpiece, a final surface is achieved by a series of electrochemical machining operations involving the progressive changing of shaped electrode tools for one or more steps in this series of operations.

9. An electrochemical machining process for enhancing the production of pocketed integrally stiffened shell and plate structures comprising the steps of:

producing a blank workpiece form, positioning selected areas of the workpiece for the application of one or more electrode tools onto said areas, for each selected area, selecting one or more of said electrode tools including faces shaped to provide a substantially uniform gap between said electrode tools and the selected area to be electrochemically machined, selecting in said electrode tools shaped electrolyte delivery orifices and electrolyte flow rates therein to produce a hydrodynamic pressure between said electrode tools and the workpiece, affecting metal removal and leaving one or more controlled patterns of secondary ribs under said orifices by plunging said electrode tools into said area, inducing said electrolyte flow and applying depleting voltage to the workpiece, and oscillating said electrode tools in a plane substantially perpendicular to the axis along which said electrode tools are plunged.

10. An electrochemical machining process for enhancing the production of pocketed integrally stiffened shell and plate structures comprising the steps of:

producing a blank workpiece form, positioning selected areas of the workpiece for the application of one or more electrode tools onto said areas, for each selected area, selecting one or more of said electrode tools including faces shaped to provide a substantially uniform gap between said electrode tools and the selected area to be electrochemically machined and mold depressions in one or more of said electrode tools to produce one or more secondary ribs, selecting in said electrode tools shaped electrolyte delivery orifices and electrolyte flow rates therein to produce a hydrodynamic pressure between said electrode tools and the workpiece, affecting metal removal and leaving one or more controlled patterns of secondary ribs under said orifices by plunging said electrode tools into said area, inducing said electrolyte flow and applying depleting voltage to the workpiece and damming selected perimeters of said electrode tools to impeded the flow of electrolyte to cause back pressure to build up in the electrolyte to enhance the electrochemical machining process.

11. An electrochemical machining process for enhancing the produced of pocketed integrally stiffened shell and plate structures comprising the steps of:

producing a blank workpiece form, positioning selected areas of the workpiece for the application of one or more electrode tools onto said areas, for each selected area, selecting one or more of said electrode tools including faces shaped to provide a substantially uniform gap between said electrode tools and the selected area to be electrochemically machined and mold depressions in one or more of said electrode tools to produce one or more secondary ribs, selecting in said electrode tools shaped electrolyte delivery orifices and electrolyte flow rates therein to produce a hydrodynamic pressure between said electrode tools and the workpiece, affecting metal removal and leaving one or more controlled patterns of secondary ribs under said orifices by plunging said electrode tools into said area, inducing said electrolyte flow and applying depleting voltage to the workpiece and preventing burn through damage to the workpiece by a sudden and rapid reduction in cathode voltage or sudden and rapid increases in cathode current by sensing automatically and arresting the current surge by circuit breaking and/or by triggering an electrolyte pressure surge and/or by triggering a rapid physical withdrawal of the electrodes from the workpiece.

* * * * *